United States Patent [19]

Hoffman et al.

[11] 4,194,211

[45] Mar. 18, 1980

[54] CHARGE ELECTRODE ARRAY FOR MULTI-NOZZLE INK JET ARRAY

[75] Inventors: Arthur R. Hoffman, Longmont; Gerald B. Lammers, Boulder, both of Colo.

[73] Assignee: International Business Machines Corporation, Armonk, N.Y.

[21] Appl. No.: 917,144

[22] Filed: Jun. 19, 1978

[51] Int. Cl.[2] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,176,191 | 3/1965 | Rowe . | |
| 3,618,858 | 11/1971 | Culp | 346/75 X |
| 3,786,517 | 1/1974 | Krause | 346/75 |
| 3,975,741 | 8/1976 | Solyst | 346/75 |
| 4,035,812 | 7/1977 | Van Breemen | 346/75 |
| 4,101,906 | 7/1978 | Dahlstrom | 346/75 |

*Primary Examiner*—Joseph W. Hartary
*Attorney, Agent, or Firm*—Homer L. Knearl

[57] ABSTRACT

A charge electrode array for a multi-nozzle ink jet array is fabricated from alternate layers of stainless steel and epoxy resin. The charge electrode array may be formed by positioning stainless steel tabs in previously grooved nonconductive substrate such as ceramic. The grooves are spaced sufficiently apart to allow insulating material to be placed between each stainless steel tab. Alternatively, a stainless steel plate may be bonded to a nonconductive substrate. Then the stainless steel can be sliced so that insulating material can be placed between each stainless steel strip. Epoxy fills the gap between tabs or strips forming an insulating layer. An ink drop charging channel through each tab or strip is formed by drilling through the tips of the steel tabs or strips, or by cutting U-shaped channels through the tips of the tabs or strips.

19 Claims, 5 Drawing Figures

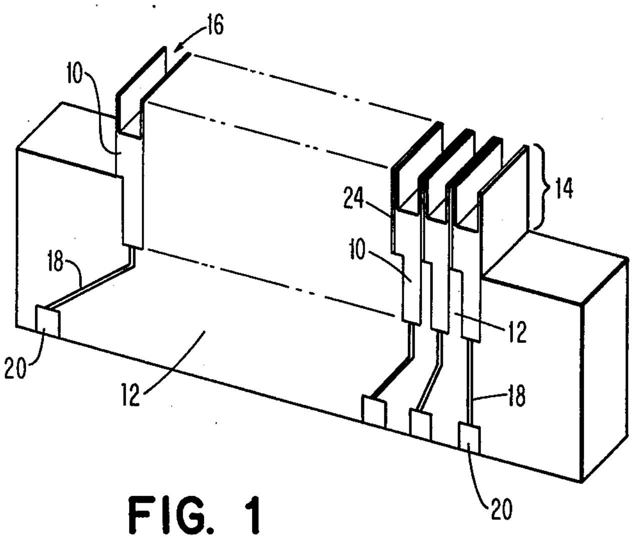
FIG. 1
FIG. 3
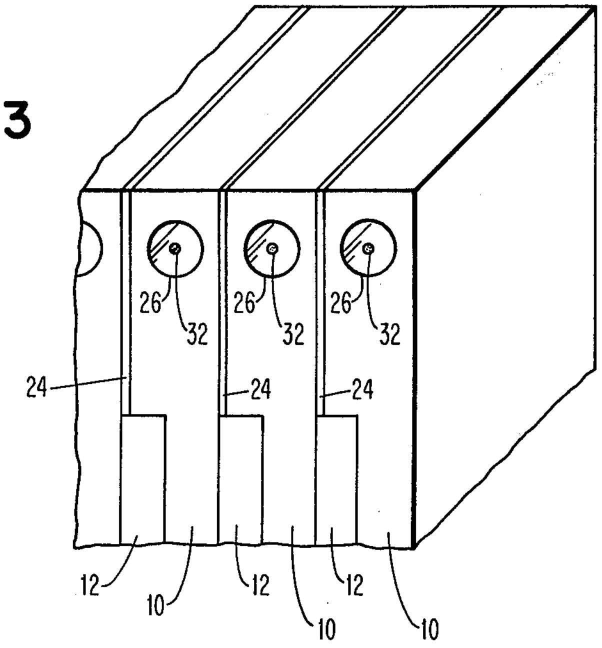

CHARGE ELECTRODE ARRAY FOR MULTI-NOZZLE INK JET ARRAY

FIELD OF THE INVENTION

This invention relates to a charge electrode array for use with a multi-nozzle ink jet array and the method for fabricating the electrode array. More particularly the invention relates to a very rugged charge electrode array which is small in size for high resolution ink jet printing while at the same time very strong structurally to resist fracture and electro-erosion.

BACKGROUND ART

The charge electrode for an ink jet nozzle is placed in the path of the stream at the point where the stream breaks into droplets. If the ink is conductive and electrically grounded, a voltage between the ink and the charge electrode will create an electrical charge in the stream adjacent the charge electrode. As the droplet breaks off from the stream, part of this charge is captured in the drop. The charged drop may then be controlled in trajectory by deflection plates placed along the path of the drop from the charge electrodes to the printing media.

For uniform charging results it is desirable to have a charge electrode that substantially surrounds the droplets with an electrical field during drop breakoff. Also, to increase speed it is desirable to print with multi-nozzle arrays, thus requiring companion charge electrode arrays. To increase resolution it is desirable for these charge electrodes to be placed on centers a few hundred microns apart. These constraints tend to create a fragile structure which is susceptible to damage by fracture or electro-erosion.

In the past, charge electrodes have been configured by cutting slots in substrates or drilling holes in substrates. The nonconductive substrates are then plated with a conductive layer to form the charge ring or charge slot. U.S. Pat. No. 3,975,741 issued to Eric R. Solyst gives a rather complete review of typical charge electrode structures of the past. Solyst further points out that such charge electrode arrays have been susceptible to damage by electro-erosion. Electro-erosion occurs because the ink is conductive and an ink mist inevitably contaminates the charge electrodes. Since adjacent charge electrodes may have different voltages applied thereto, the combination of conductive ink contamination of the electrodes and voltage between the electrodes causes electro-erosion of the electrodes.

In addition, the ink itself can be quite basic having a pH as high as ten. This alkaline solution can gradually corrode the electrodes. Thus, plated electrodes in the order of two or three microns thick can very quickly be destroyed by the ink or by electro-erosion between adjacent charge electrodes.

One attempt at preventing such electro-erosion and corrosion is to coat the plated conductive layer with an insulating layer of glass. This has the disadvantage that charge may collect on the insulating layer and partially inhibit the charging of the ink drops. In addition, the protective coating is subject to pin holes or other defects and, as a result, the ink seeps through to the conductive layer to corrode or electrically erode away the conductive layer.

Another attempt at solving the electro-erosion problem is taught in U.S. Pat. No. 4,035,812 issued to VanBreeman et al. VanBreeman et al teaches the placement of a resistor in the charge circuit path so that if the ink does short two electrodes, the resistor will limit the current flow and, hopefully, limit the damage to the charge electrodes. While this should help the electro-erosion problem, it creates a substantial fabrication problem in trying to place a bulk resistance near the charge electrode.

SUMMARY OF THE INVENTION

It is an object of this invention to provide a charge electrode array with substantial structural strength in order to be resistant to damage by fracture or electro-erosion.

In accordance with this invention, the durability of the charge electrode array has been increased by laminating steel tabs or plates and insulating material and thereafter cutting the charge electrode channel in the steel tabs. The array may be fabricated by sawing grooves in a nonconductive substrate. Stainless steel tabs are then inserted into the grooves. The tabs extend out the end of the grooves and the grooves function to maintain center-to-center spacing between the tabs. The tab thickness is such that in the portion of the tab that extends out of the ceramic there is a space between adjacent tabs. This space may then be filled with the electrical insulating material to form the laminated structure of stainless steel and insulating material. Alternatively, the stainless steel layers may be fabricated by bonding a steel plate to the nonconductive substrate. Then the steel plate is cut into tabs or strips by sawing slots through the plate. The slots may then be filled with electrical insulating material to form the laminated structure of alternate layers of stainless steel and insulating material. After the laminated array has been formed, channels are cut in the stainless steel by either sawing slots, U-shaped channels, or by drilling holes, cylindrically shaped channels.

This inventive laminated charge array structure forms electrodes having a substantial steel thickness in their walls. With this thickness of steel the charge electrodes are much more resistant to fracturing than a similar thickness of a ceramic material placed with a conductive layer. At the same time the thickness of the steel is much greater than a plated coating and thus the charge electrodes can withstand electro-erosion. The inventive structure is particularly advantageous for high resolution ink jet printers as described hereinafter under the heading "Industrial Application".

BRIEF DESCRIPTION OF DRAWINGS

FIG. 1 shows the laminated charge electrode array with electrical connections for each electrode.

FIG. 3 shows the laminated array of FIG. 2 with holes drilled through the ends of the electrodes to form the channel through which ink drops pass.

DETAILED DESCRIPTION

Figure 2:
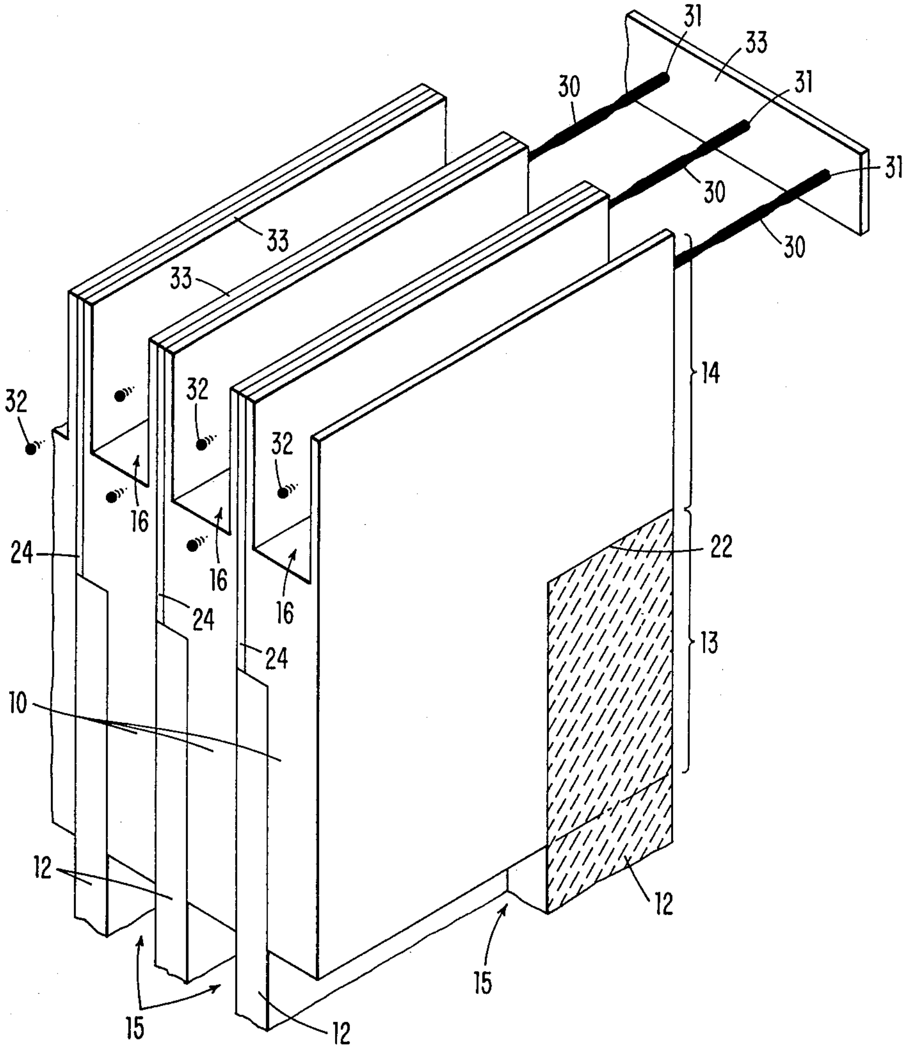
FIG. 2 shows the embodiment of the laminated electrode array with the metal layers positioned in grooves in a nonconductive substrate, and also having U-shaped channels cut through the ends of the electrodes.

FIG. 1 shows one embodiment of the laminated charge electrode array for a multi-nozzle ink jet array. The stainless steel layers 10, forming the charge electrodes, are mounted in a ceramic substrate 12. The substrate 12 has grooves in which the stainless steel electrodes are placed. The center-to-center spacing of the electrodes is substantially the same as the center-to-center spacing of the nozzles in the ink jet array with which the charge array would be used. The stainless steel electrodes 10 are laminated with epoxy which is allowed to flow between the electrodes after they have been mounted in the substrate 12. The epoxy also flows between the electrodes 10 and the grooves of the substrate 12 to cement the electrodes in place.

After the epoxy hardens, it forms an insulating layer between each of the stainless steel electrodes 10. The laminated structure of epoxy and stainless steel along the top 14 of the head may then be used to form the charge electrode array. The charging channels for the ink jet drops are formed in the array by gang sawing slots 16 through the tips of the electrodes 10. After the slots 16 have been cut through the electrodes 10, the charge electrode array is finished except for providing electrical connection to each of the charge electrodes 10.

Electrical connection to the electrodes 10 could be accomplished by soldering wires to the ends of the stainless steel tabs 10. However, it is preferred to fill the grooves in substrate 12 and thereafter use printed circuit techniques to plate a conductive strip 18 from a pad 20 to the electrodes 10.

The details of the construction of the charge electrode array in FIG. 1 are better shown in FIG. 2. Initially grooves 15 are sawed into the ceramic substrate 12. These grooves may be accurately cut and serve to guarantee the center-to-center spacing of the charge electrode steel tabs to be placed in the grooves. The stainless steel tabs 10 have a base portion 13 and a head portion 14. The base portion has a width to precisely fit in the grooves 15. The head portion abuts against the top edge 22 of the ceramic 12. The width of the head portion is greater than the width of grooves 15 but less than the center-to-center distance between grooves so that a separation space exists between the head portions of adjacent tabs. When the tabs 10 are in place, epoxy is poured in the space between the tabs 10 to bond them together and form an insulating layer 24 between each tab 10. The epoxy also flows down the tabs 10 between the edge of tabs 10 and the walls of the grooves 15 to bond the tabs into the grooves of the ceramic substrate 12.

After the epoxy dries, the array is a laminated steel tab and epoxy structure bonded to the top edge 22 and the grooves 15 of the ceramic substrate 12. It only remains to form the channels 16 in the tabs 10 through which the ink stream 30 may pass. As the ink stream breaks into ink droplets 32 within the channels 16, the ink droplets are charged by the charge electrodes 10.

The channel in the preferred embodiment is a U-shaped channel cut in the tips of the tabs or electrodes by ganged saw blades. The electrodes are precisely positioned by being placed in the grooves 15. The electrodes are positioned by grooves 15 to have the same center-to-center spacing as the center-to-center spacing between nozzles 31 on nozzle plate 33. To accurately cut the channels 16, the ganged saw blades may be precisely positioned and separated by very precise distances. For example, the saw blades might be ganged to cut slots in every tenth charge electrode. After one cutting operation through the electrodes, the ganged saw blades would be indexed relative to the tabs the width of the center-to-center distance between electrodes and the adjacent electrodes would be slotted. By repeating this action ten times, all of the electrodes would be slotted.

FIG. 3 shows an alternative embodiment for the charge electrode array wherein the channels for ink drops 32 are holes 26 drilled through the electrodes 10. The cylindrical holes 26 may be gang drilled just as the slots in FIG. 2 are gang sawed. In other words, the precise position of the tabs 10 is known relative to each other because the grooves 14 in the ceramic substrate have precisely positioned the tabs. Thus, after the epoxy layers have dried and the laminated charge electrode array structure is formed, the holes 26 may be gang drilled.

As described before for the slots, the drills could be positioned to drill a hole through every tenth tab. After drilling the holes in every tenth tab, the ganged drills would be indexed relative to the tabs a distance equal to the center-to-center spacing between tabs. After drilling and indexing for ten times, all tabs would have holes 26 drilled through them.

Summarizing FIGS. 2 and 3, the charge electrode array is fabricated by gang sawing grooves in a ceramic substrate 12. The grooves 15 in the substrate then are filled with stainless steel tabs or electrodes 10. The tabs 10 are precisely positioned center-to-center by the grooves 15. With the tabs 10 in position, epoxy is flowed between the tabs and into the grooves to the extent necessary to bond the tabs one to another and to the substrate 12. After the epoxy resin hardens, a strong laminated structure of alternate stainless steel tabs and epoxy insulating layers is formed atop the ceramic substrate. The tabs may then have the charging channel formed by gang sawing slots through the top of the tabs 10 or by gang drilling holes through the tabs 10.

Figure 4:
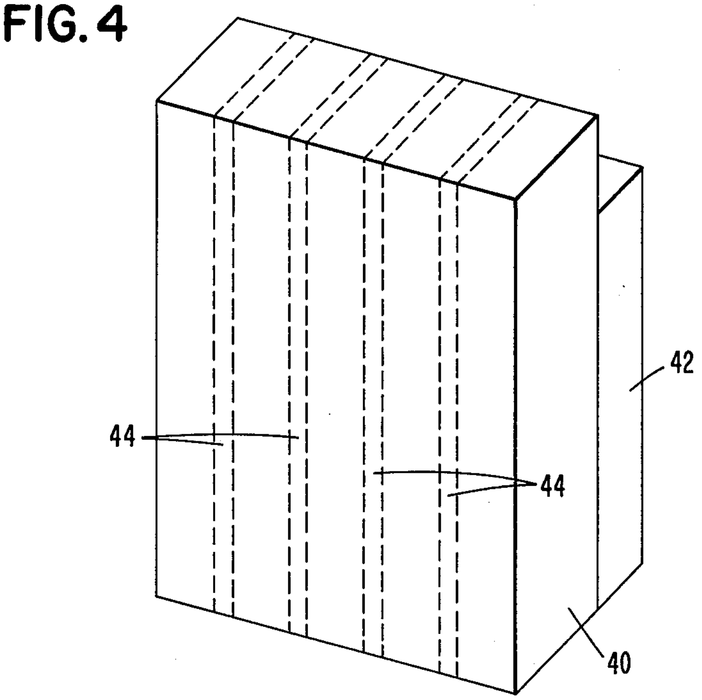
FIG. 4 shows a metal layer bonded to a nonconductive substrate before the metal layer is sliced to form individual electrodes.
Figure 5:
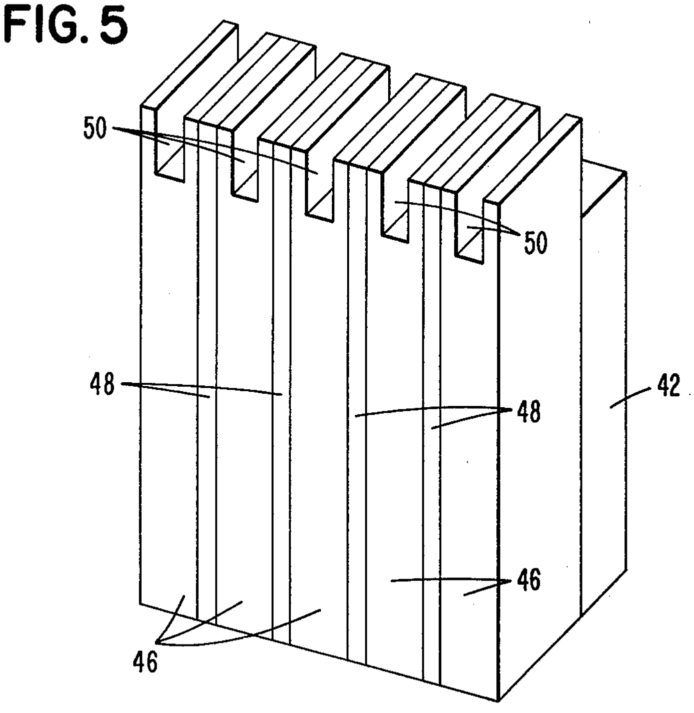
FIG. 5 shows a laminated array formed from the metal layer in FIG. 4.

Another embodiment of the invention and the method for fabricating the embodiment is represented in FIGS. 4 and 5. In this embodiment a conductive metal plate, 40, is bonded to a nonconductive substrate, 42. The electrodes are then formed by sawing slots 44 (position indicated by dashed lines) all the way through the metal layer, 40. The individual electrodes are held in position on the substrate because they are bonded to the substrate before slots 44 are sawed through the layer 40. The slots are cut such that the electrodes are positioned with substantially the same center-to-center spacing as the center-to-center distance between nozzles in the ink jet array with which the charge array will be used.

After slots 44 have been cut through the metal layer, the slots are filled with an insulating material. The insulating material is preferably an epoxy resin. The epoxy, in addition to insulating the electrodes, one from another, also serves to bond the structure solidly together. After the slots 44 have been filled with epoxy resin, the structure is allowed to dry and harden. Then the ends of the electrodes have U-shaped slots cut through them to form the charging channels.

The finished structure for the charge electrode array is shown in FIG. 5. The electrodes 46 cut from the metal layer 40 in FIG. 4 are separated by the epoxy resin layer 48, now filling the slots 44 (FIG. 4). The charging channels 50 have been cut or sawed through the tips of the electrodes 46. The laminated structure of metal layers and epoxy are bonded to substrate 42.

It will be appreciated by one skilled in the art that the laminated structure making up the charge electrode array might be fabricated in a number of ways. As shown above, the conductive metal plates might be precisely positioned by placing individual plates in a mount or by cutting a single metal layer into a plurality of plates. In any event, the space between plates is then filled with an insulating material and the charging channel is cut, or drilled through the ends of the metal plates.

INDUSTRIAL APPLICATION

While the structure might be used in any charge electrode ink jet application, it is particularly advantageous for high resolution ink jet printing. For example, in FIG. 2 the ink streams 30 and the ink droplets 32 formed therefrom are on the order of 25 microns in diameter. The center-to-center spacing between ink streams is about 0.32 millimeters. Accordingly, the spacing between slots 16 and thus electrodes 10 is about 0.32 millimeters. The width of the slots 16 and the diameter of the holes 26 in FIG. 3 is approximately 0.20 millimeters. This leaves approximately 40 microns thickness for each of the walls 33 of the slot 16 and also 40 microns thickness for the epoxy insulating layers 24.

The 40 micron thickness of the walls can be increased to eighty or one hundred microns with little risk of narrowing slots 16 too much for the passage of the 25 micron ink droplets. Thus, the inventive structure allows for walls of the charging slot 16 to be in the order of 100 microns thick while the prior art plated walls are typically in the order of two or three microns thick.

Accordingly, the thick walls of the invention are far less susceptible to damage by electro-erosion than the two or three micron thick conductive coating in the prior art plated charge electrodes. Further, the laminated steel epoxy structure of the inventive charge electrode array is far stronger than the plated ceramic slots in the prior art whose strength is limited to the strength of the ceramic material.

While the invention has been particularly shown and described in the embodiments using U-shaped slots or cylindrical holes for the charging channel, it will be appreciated by one skilled in the design of electrical fields, that alternative configurations for the charging channel might be formed in the ends of the tabs. Further, the laminated structure might be formed with other conductive metals and nonconductive insulating layers besides stainless steel and epoxy. Any structurally strong and electrically conductive material might be used for the metal layers and any insulating material might be placed between the metal layers.

While we have illustrated and described the preferred embodiments of our invention, it is to be understood that we do not limit ourselves to the precise constructions herein disclosed and the right is reserved to all changes and modifications coming within the scope of the invention as defined in the appended claims.

We claim:

1. In an ink jet printer an array of electrodes for charging ink drops comprising:

- a plurality of electrically conductive charge electrodes, each electrode having a base portion and a head portion;
- a substrate of nonconductive material with grooves of substantially the same width as the base portion of said electrodes for supporting each of said electrodes with the head portion above the surface of the substrate when the base portion rests in a groove and said grooves positioned a distance apart greater than the width of the head portion of the electrodes so that there is a separation space between the head portion of each electrode and the head portion of an adjacent electrode;
- nonconductive material filling the separation space between the head portions of the electrodes for insulating each electrode from the adjacent electrode;
- a channel in the head portion of each electrode through which ink drops may pass and be charged.

2. The charge electrode array of claim 1 wherein said electrodes are formed from stainless steel tabs.

3. The charge electrode array of claim 2 wherein said nonconductive material for filling the separation space is an epoxy resin.

4. The charge electrode array of claim 3 wherein said substrate of nonconductive material is a ceramic material.

5. The charge electrode array of claim 1 wherein the nonconductive material for filling the separation space is an epoxy resin.

6. The charge electrode array of claims 1, 2, 3, 4 and 5 wherein said channel in the head portion of the electrodes is a U-shaped slot through the head portion of the electrodes.

7. The charge electrode array of claim 1, 2, 3, 4 or 5 wherein said channel in the head portion of the electrode is a cylindrically shaped hole through the head portion of the electrode.

8. In a multiple nozzle array ink jet printer, an array of charge electrodes for charging ink droplets formed by the ink jet nozzles comprising:

- conductive metal strips, each strip forming a separate electrode in the array;
- a nonconductive substrate bonded to all said metal strips for holding said conductive metal strips in spaced apart positions above the surface of the substrate with the center-to-center spacing of said strips corresponding substantially to the center-to-center spacing of the ink jet nozzles;
- a nonconductive insulating material in the space above the substrate and between said metal strips for electrically isolating the strips from each other;
- a channel through each of said metal strips, said channel being aligned with the ink stream from a nozzle so that, as each ink stream passes through a channel and breaks into droplets, the droplets may be charged.

9. The charge electrode array of claim 8 wherein said conductive metal is stainless steel.

10. The charge electrode array of claim 8 wherein said nonconductive insulating material is an epoxy resin.

11. The charge electrode array of claim 8 wherein said conductive metal is stainless steel and said nonconductive insulating material is epoxy resin.

12. The charge electrode array of claims 8, 9, 10 or 11 wherein said channel is a hole through each of said metal layers.

13. The charge electrode array of claims 8, 9, 10 or 11 wherein said channel is a slot through each of said metal layers.

14. Method for fabricating an array of charge electrodes for a multiple nozzle ink jet printer comprising the steps of:

forming an integrated structure of conductive metal plates bonded to a nonconductive substrate, the metal plates being spaced apart and the center-to-center distance between the plates being substantially the center-to-center distance between the ink jet nozzles;

filling the space between the plates with an insulating material whereby a laminated array of alternate layers of conductive plates and insulating material is bonded to the nonconductive substrate;

cutting a charging channel through each of the metal plates parallel to the direction of flow of the ink stream from the ink jet nozzles.

15. The method of said claim 14 wherein said positioning step comprises the steps of:

cutting grooves in a substrate, the center-to-center spacing of the grooves being substantially the same as the center-to-center distance between the ink jet nozzles;

mounting the metal plates in the grooves with a portion of the plates extending above the substrate so that there is a space between the metal plates.

16. The method of claim 15 wherein the substrate is a ceramic material, the metal plates are made from stainless steel and the insulating material between the plates is epoxy resin.

17. The method of claim 14 wherein the insulating material in the filling step is epoxy resin.

18. The method of claims 14, 15, 16 or 17 wherein the channel cutting step comprises the steps of:

sawing a slot through every Nth metal plate with ganged saw blades spaced N center-to-center nozzle distances apart;

indexing the ganged saw blades one center-to-center distance relative to the metal plates;

repeating the sawing step and the indexing step N times whereby a channel is cut in each metal plate.

19. The method of claims 14, 15, 16 or 17 wherein the channel cutting step comprises the steps of:

drilling holes through every Nth metal plate with ganged drilled spaced N center-to-center nozzle distances apart;

indexing the ganged drills one center-to-center distance after each drilling step;

repeating the drilling and indexing steps N times to cut channels in each of the metal plates.

* * * * *